Oct. 16, 1934.   J. N. O. ROGERS ET AL   1,977,147
ENDLESS BELT CONVEYER
Filed Feb. 24, 1933   7 Sheets—Sheet 1
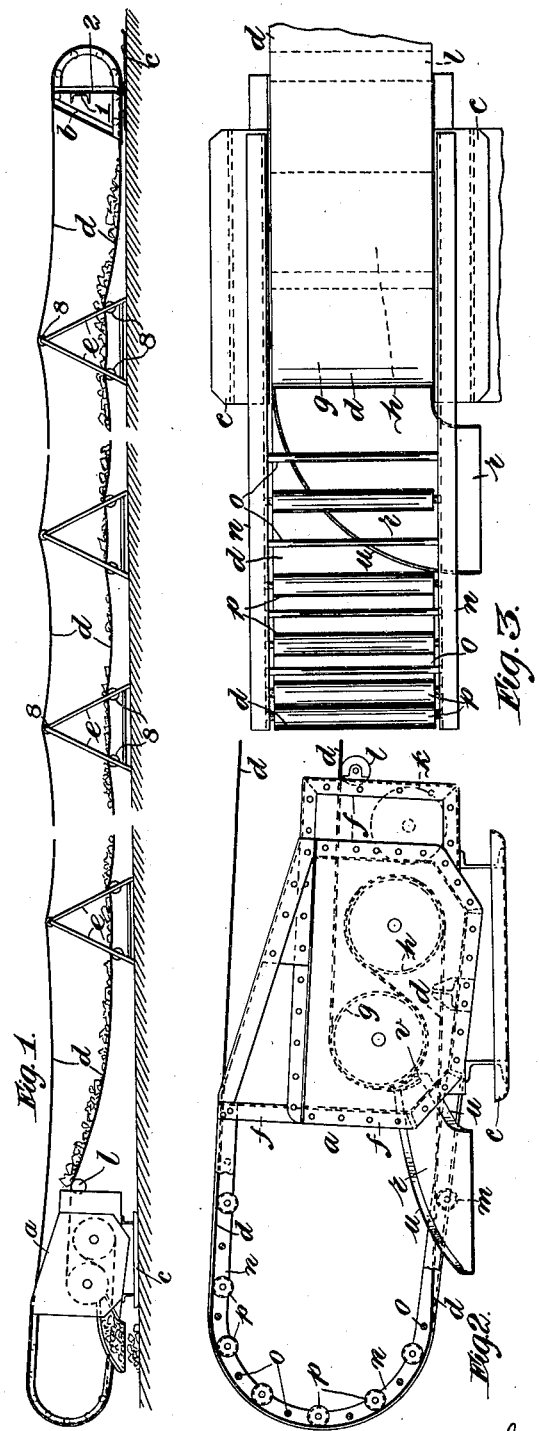

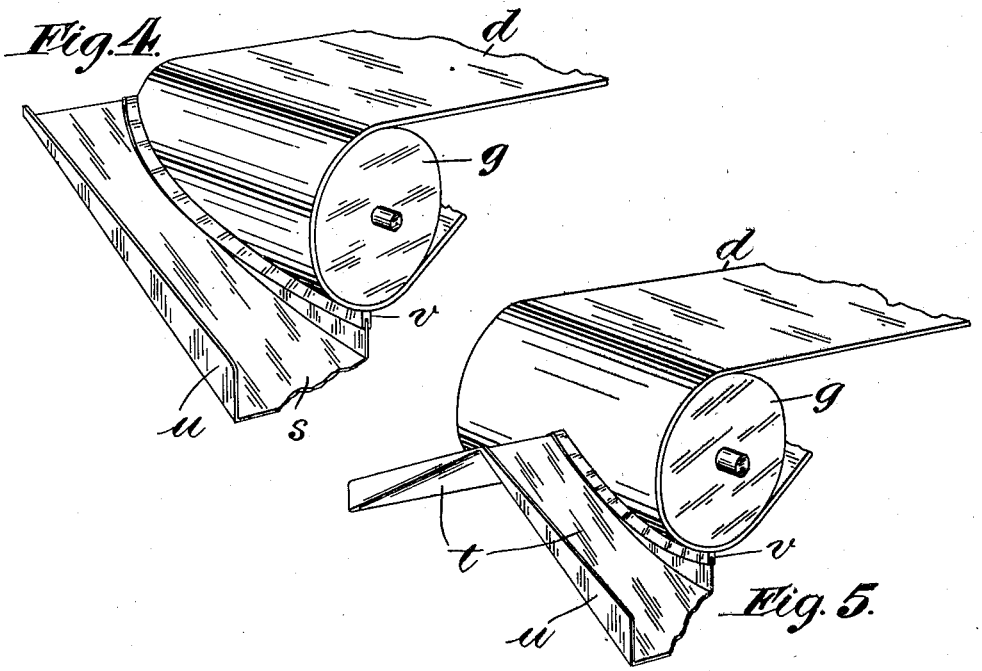
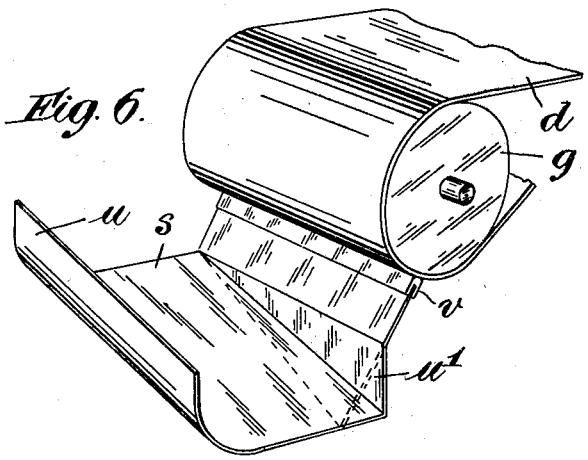
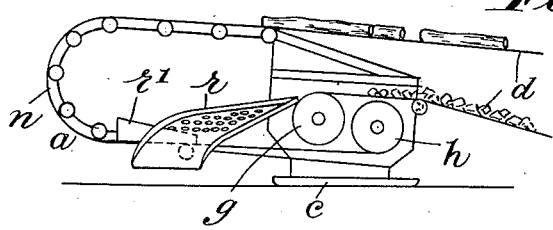

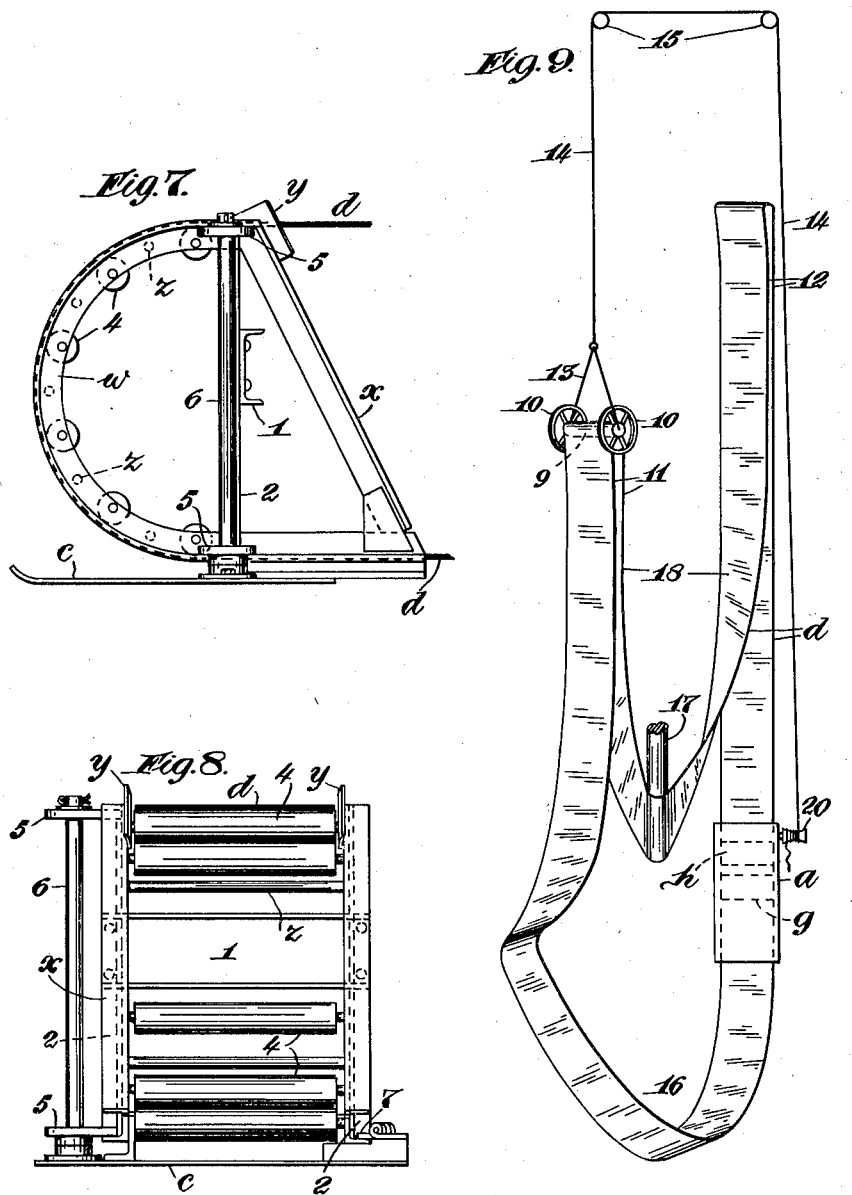

Oct. 16, 1934.                J. N. O. ROGERS ET AL                1,977,147
                                ENDLESS BELT CONVEYER
                              Filed Feb. 24, 1933        7 Sheets-Sheet 4
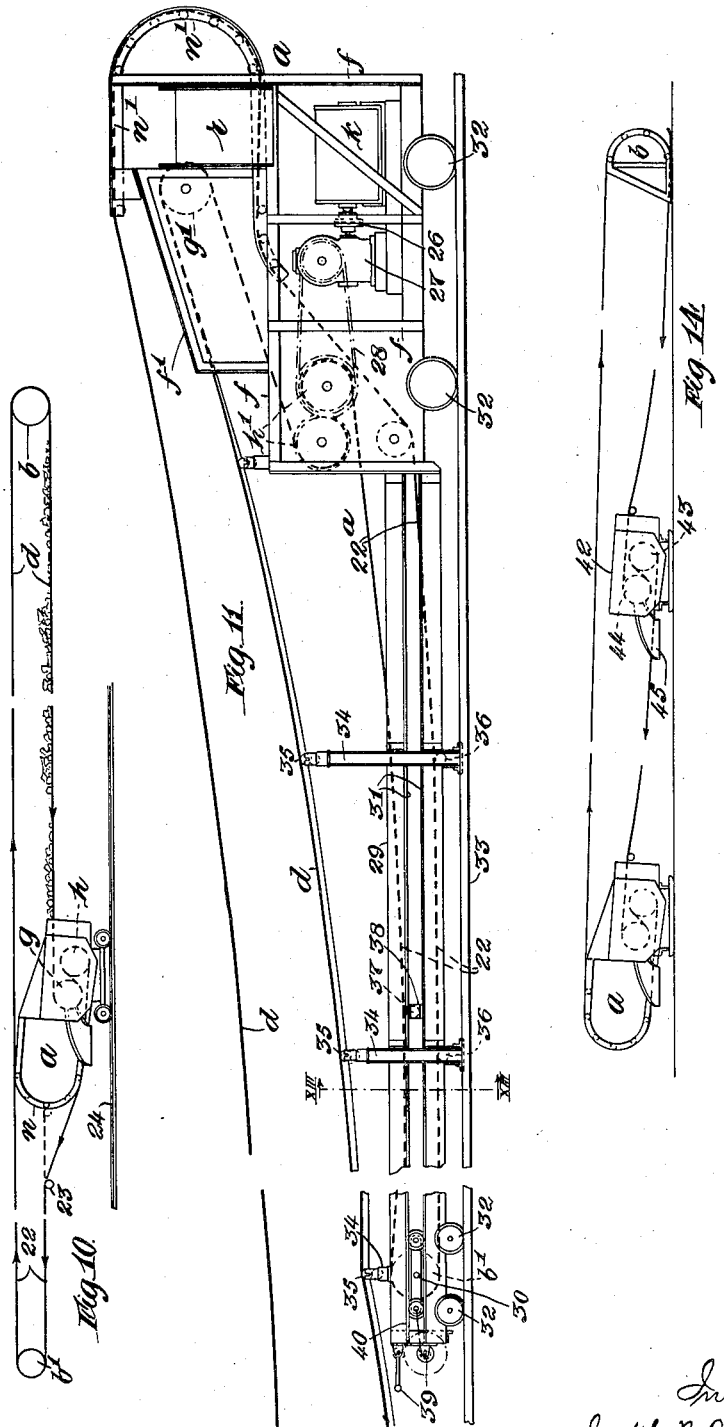

Oct. 16, 1934.  J. N. O. ROGERS ET AL  1,977,147
ENDLESS BELT CONVEYER
Filed Feb. 24, 1933  7 Sheets-Sheet 5
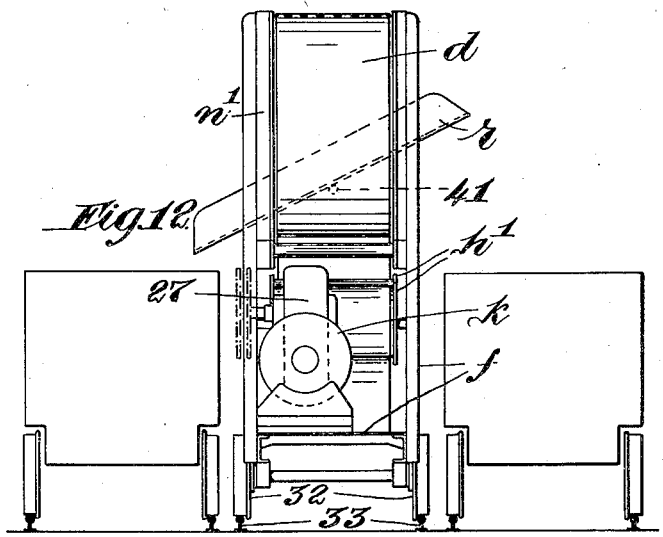
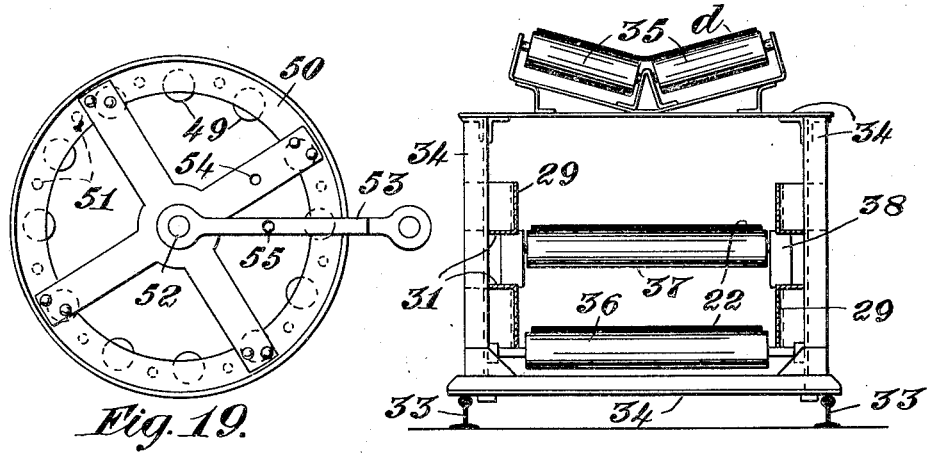

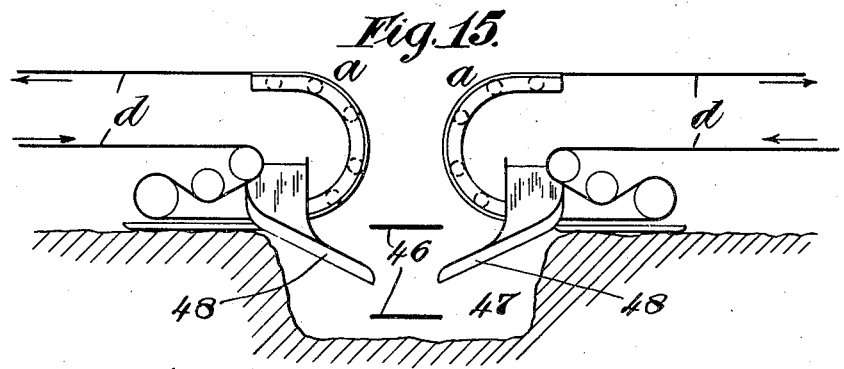
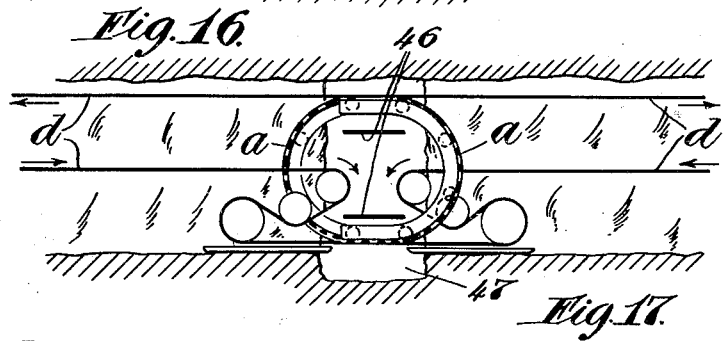
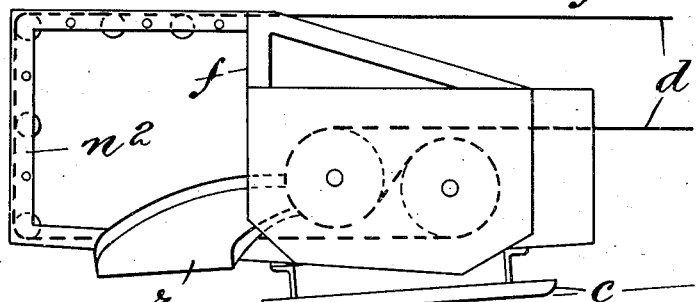
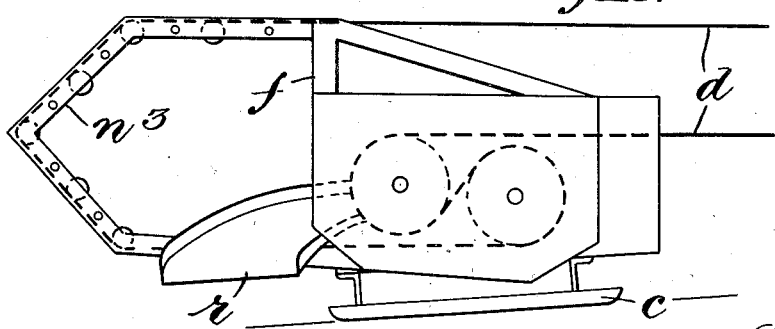

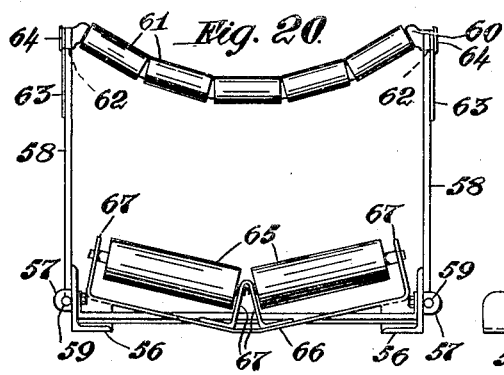
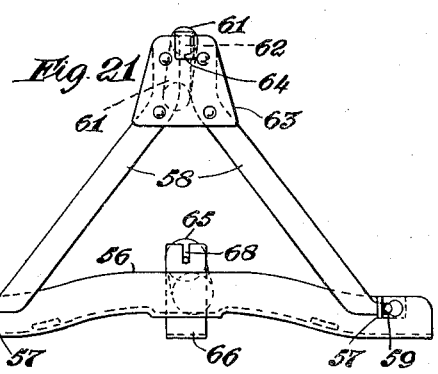
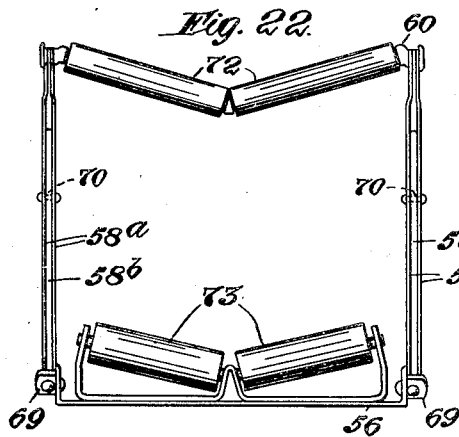
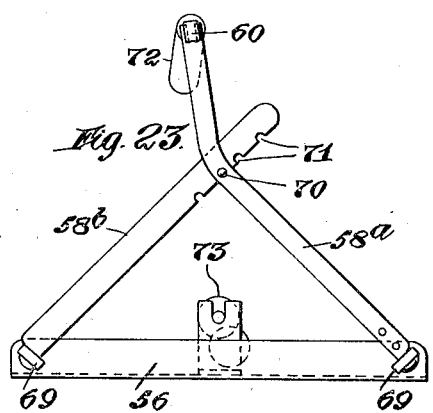
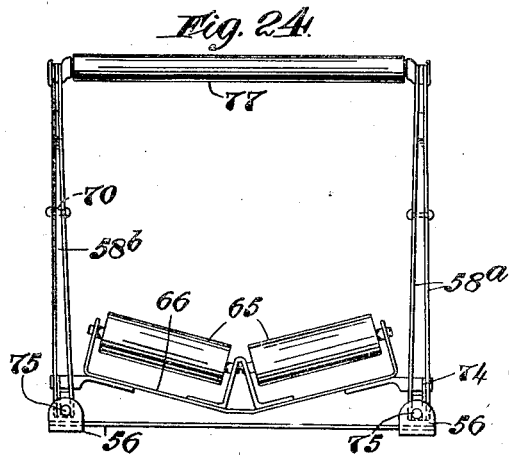
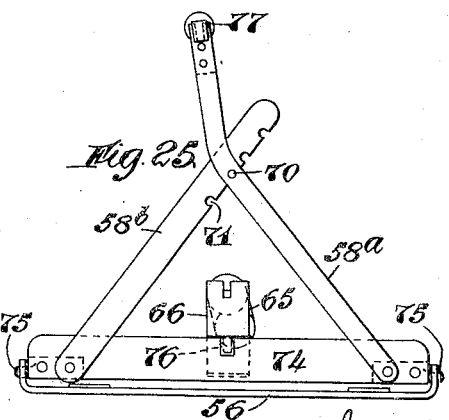

Patented Oct. 16, 1934

1,977,147

UNITED STATES PATENT OFFICE 1,977,147

ENDLESS BELT CONVEYER

Joseph Nelson Octavius Rogers and Thomas Charlton, Silksworth, near Sunderland, England Application February 24, 1933, Serial No. 658,458 In Great Britain July 20, 1932

7 Claims. (Cl. 198—186)

This invention relates to transportable endless-belt conveyers suitable for coal or similar loose or divided material and is concerned with conveyers of the flexible type namely conveyers in which there are at least two independent units with the belt extending in superposed strands or flights between them, one of which units may be called the discharge unit and the other the return unit. The term flexible is used because conveyers of this type can be laid along an irregular floor and their flexibility will enable them to conform to the irregularities. This invention is not concerned with endless-belt conveyers of the rigid type namely conveyers in which the whole belt is supported on a unitary frame or structure or on rollers in fixed supports.

The invention is more particularly intended for conveying in mines, although the improvements are capable of other applications such as pit-head conveying, conveying in factories and on quays or wharves.

With the endless-belt conveyers of the flexible type referred to, the general practice in mines has been to effect conveying of the coal by the upper strand or run of the belt which delivered the coal at the discharge unit at one end of the conveyer and returned by its lower strand to the return unit at the other end. Usually the upper strand of the belt has been run between side plates or guides and inverted troughs or pans have been provided for protecting the return strand from picking up dust and dirt or from spillage of coal from the upper strand. Ploughs or like devices have also been provided in conveyers of this type for deflecting dirt from the lower strand of the belt so that it should not be carried to the rollers at the return end of the conveyer.

The principal object of the invention is to provide simple and improved constructions of conveyer capable among other things, of efficient and economical operation, with less labour, in the conveying or loading of coal in mines and adapted for reliable operation under rough conditions with reduced liability of damage to the belts employed. Further objects are to provide improvements allowing adjustments of the length of these conveyers or of the position of feed and discharge points in ready and simple manner and generally to improve the operation and increase the sphere of use of the conveyers.

According to this invention, transportable endless-belt conveyer apparatus suitable for coal or like material and of the flexible, superposed strand, type referred to, is constructed and adapted for load conveying by the lower strand of the belt and comprises a discharge unit which is constructed and adapted for discharging conveyed material from such lower strand over a discharge roller mounted in the interior of such discharge unit and is provided with a bowed frame formation having a series of rollers around the bow for forming the belt into an open loop after said discharge and before passing to the upper strand.

By the aid of the invention it is possible in the type of transportable conveyer described, to lessen the height to which the materials have to be lifted to load them on to the conveyer when loading is from the floor because the materials only have to be lifted to the lower strand of the belt. As a result a considerable lightening of labour or work is achieved which is an important advantage in mines. It is also possible to arrange the return strand of the belt in an elevated position out of the way so that it is not liable to damage from material spilled during loading or conveying or from rough floor surface. The construction also does not require troughs and pans for the protection of the return strand of the belt, so that expense may be saved and the conveyer more expeditiously moved to new positions. The conveyer is also cheap to construct and both the upper and lower strands of the belt may be constantly and conveniently open to inspection. Moreover, if there is sufficient height available the upper strand of the belt may be conveniently used for auxiliary conveying purposes. It is also possible by this invention to adapt these conveyers with advantage to restricted conditions obtaining in the underground discharge roadways of mines, which roadways are usually limited in width, as all the driving and discharge unit apparatus can be brought within the roadway dimensions.

In some cases, the discharge and return units may be arranged at the ends of the conveyer. However the invention also comprises an arrangement by which a discharge unit is situated between the ends of the conveyer and has the belt travelling to it in the lower strand, and other arrangements are possible according to requirements.

The units are suitably provided after the known manner with slidable base plates, sleds, wheels or the like so as to be easily shiftable over the floor and as the belt proceeding from the discharge roller takes up an open loop formation on a series of rollers with the carrying surface from the lower strand of the belt inside, the invention provides for advantageous removal of any dust or small material clinging to the belt.

An advantageous construction of discharge unit comprises a bowed or U-like framework provided with a series of small rollers for the formation of the belt into an open loop and fitted, in the space within, with one or more chutes, inclined plates, ploughs, deflectors or the like for directing materials laterally from the conveyer at the discharge roller or other suitable point. The return unit construction may also comprise a bowed or U-like framework carrying a series of small rollers for supporting the belt, or a complete circle of small rollers or simply a conventional roller arrangement comprising one or more rollers, may be used mounted on a suitable frame or support. The return unit construction is preferably such as to allow ready dismantling and remounting of the belt without break of joint when it is desired to shift the conveyers to new positions, and as an example, the roller framework may be adapted to swing bodily for this purpose, or the rollers may be mounted on supports in the form of wheels and be wheeled out of and into position. For the same purpose, the rollers may be removable from their framework or supports, or in some cases the discharge unit may have a removable roller or rollers. Intermediately between the discharge and the other or the other or return units of the conveyers, the conveyer belt may be supported by roller devices which may be constructed to give the belt a flat or a trough formation as desired, and of course would be suitable for supporting the strands of the belt at an appropriate distance apart vertically to allow convenient loading on to the lower strand. These roller devices may take the form of portable frames or trestles with appropriate rollers, and for the purpose of facilitating advance of the conveyers to new positions, frames or trestles may be used which are collapsible so as not to interfere with the removal and re-forming of the belt. The trestles may also be made adjustable to suit various working heights.

Operation of the conveyers is by suitable motor or engine (compressed air, electric or otherwise) and the motor may be applied either to the discharge or return units of the conveyers or motors may be applied at each end.

In order to enable the invention to be readily understood reference is directed to the accompanying drawings in which:—

Figure 1 is an elevation illustrating one construction of conveyer in accordance with these improvements.

Figure 2 is a side elevation of the discharge unit of the conveyer of Figure 1 part of the conveyer belt also being shown.

Figure 3 is a plan of Figure 2 omitting the upper strand part of the conveyer belt.

Figures 4, 5 and 6 are perspective views illustrating modified forms of discharge spout or chute for discharge units of the improved conveyers.

Figure 6ᵃ is an elevation illustrating a gridded form of discharge chute.

Figure 7 is a side elevation of the return unit of the conveyer of Figure 1, also including part of the conveyer belt.

Figure 8 is an end elevation of Figure 7 omitting part of the belt.

Figure 9 is a diagrammatic view illustrating one method of advancing the conveyer belt to a new place or run.

Figure 10 is a side elevation in diagrammatic form, of a modified construction of conveyer in accordance with the invention.

Figure 11 illustrates an important modification of the conveyers for gate conveying and loading purposes, the view being a side elevation.

Figure 12 is an end view of Figure 11, to a larger scale, with tubs in position on each side of the conveyer.

Figure 13 shows on a larger scale a section on the line XIII—XIII of Figure 11.

Figure 14 is a diagrammatic side elevation of a further modification.

Figures 15 and 16 are fragmentary diagrammatic views to illustrate suitable combinations of the conveyers.

Figures 17 and 18 are diagrammatic views illustrating modified constructions of the bowed or U-like frame part of the discharge units.

Figure 19 is a side elevation of another construction of the return units.

Figures 20 and 21 respectively illustrate in end view and side view a modified construction of trestle and roller devices for use at intermediate points of the conveyer belt, and Figures 22 and 23, and 24 and 25 are similar views of other forms which may be given to the trestle and roller devices.

The conveyer shown in Figure 1 is suitable for mines and comprises at the ends a discharge unit $a$ and a return unit $b$. These units are separate from each other and are mounted on slidable base plates, sleds or the like $c$ so as to be capable of being moved readily about the mine floor. The endless conveyer belt $d$ extends between the two units and is carried intermediately by suitable roller supports or trestles such as $e$ and the construction of the parts is such that the belt is supported in superposed strands or flights with space between them sufficient to allow loading of materials on to the lower strand.

The discharge unit $a$ is shown in greater detail in Figures 2 and 3 and comprises a more or less rectangular main frame $f$ on the base plate or the like $c$ and a pair of rollers $g$, $h$, for the belt $d$, mounted in the frame. The rollers are arranged in the frame parallel to each other and one suitably at a slightly higher level than the other. The motor $k$ for driving the conveyer and seen diagrammatically in Figure 2, may be mounted in the frame $f$, or it may be on a separate base and coupled up, and it may drive either one or both of the rollers $g$, $h$, through a suitable reduction gear (not shown). The lower strand of the conveyer belt $d$ is led to the furthermost roller $g$ over an idler $l$, passes over this roller $g$ beneath and then up and over the second roller $h$ from which the belt continues at a lower elevation over an idler $m$ as illustrated. The frame $f$ is extended at one end as a bowed or U-form frame part $n$ comprising sides of angle iron joined by bolts or the like $o$, and fitted around the bow or U is a series of loosely mounted rollers $p$, by which the belt $d$ is guided before commencing its return flight in the upper strand shown. This frame part or framework $n$ with the belt passing round it as a loop, provides a clear space within, in which there is suitably mounted a curved chute or spout $r$ for receiving the coal discharged from the belt over the roller $g$. The chute preferably curves round to present its mouth parallel with and slightly outside one or other side of the bowed frame part $n$ as seen for example in Figure 3. The framework $n$ is open at the sides and thus lateral discharge of the coal from the conveyer takes place with great facility.

It is not essential, of course, to employ a curved chute or spout for discharge from the bow. As an alternative and as seen in Figure 4 there may be used a plate $s$ sloped transversely across the space within the frame-part $n$ and suitably fitted to the curvature of the discharge roller $g$. Or two plates or chutes $t$ disposed like an inverted V, as in Figure 5, may be used in which case discharge would be to each side of the conveyer. Other constructions are also possible, and it is convenient to form the chutes or plates with upwardly extending side parts as at $u$, while the chutes may also be fitted with a rubber wiper at the discharge roller as shown for instance at $v$. In some cases, the discharge roller would be placed forwardly of or beyond the main frame $f$ of the discharge unit, and in order to obtain a suitably free discharge of coal and dust into the chute it is of advantage to form the chute so that the rubber wiper comes well beneath the discharge roller. The latter may necessitate increasing the height of the bowed or U-like framework $n$ and when the discharge roller is not forward of the main frame $f$, the chute side and rubber wiper are sloped forward sufficiently to clear the frame. In Figure 6, for example, the wiper $v$ extends well beneath the discharge roller $g$ and the chute side may be sloped forwardly to a wedge-shaped side part $u'$ or may be extended as shown in dotted lines to trim directly into the chute. Of course, if the discharge roller were forward of or beyond the main frame $f$, the wiper $v$ in Figure 6 would be vertical. As an alternative to the discharge chutes or plates, the material discharge might in some cases be allowed to fall over the discharge roller $g$ on to the part of the belt running away from the roller $h$ and a plough or deflector device be provided to displace the discharged coal laterally from this part of the belt. It may further be mentioned that it is possible to make the discharge spout or chute $r$ of gridded or screen-like form, as seen for example in Figure 6$^a$, and then by placing the same fairly high up on the discharge roller $g$, the larger coal may be removed laterally by the discharge chute and the finer coal passing through the grid could be wiped off the part of the belt running away from beneath the roller $h$ by a plough or deflector $r'$. Any fines likely to be carried beneath the plough may travel a short distance up the bow $n$ but would eventually fall back and discharge as will be understood. By the use of such a gridded chute, the larger pieces of coal can be discharged at the same place as the small coal, but without fall likely to cause breakage of such larger coal.

The return unit $b$ of the conveyer of Figure 1 is seen in further detail in Figures 7 and 8. It comprises a frame part $w$ of bowed or U-like construction similar to the frame part $n$ of the discharge unit but of less height as its only duty is to return the belt to the discharge unit. The lower part may be slightly longer than the upper part, giving the bowed frame part a sort of J-form in order to guide the lower strand of the conveyer belt $d$, and the frame also comprises inclined angle-bar parts $x$ having outwardly directed ears $y$ for guiding the entry of the upper strand. The angle-iron sides of the frame are joined by bolts or the like $z$ and by a girder section or plate 1 extending between uprights such as 2 which stretch across the respective sides of the frame and the whole is mounted on the base plate, sled or the like $c$. The rollers 4 are loosely mounted in the frame as before.

The above construction of the return unit is more particularly suitable when the conveyer is driven at the discharge unit. It is possible, however, to effect drive at the return unit and, in that case, this unit, mounted on its base plate, sled or the like, may comprise any of the conventional arrangements of rollers normally used for belt return purposes, for instance, a pair of rollers side by side with the furthermost one at a slightly higher level than the other, something like the rollers $g$, $h$ aforesaid. The upper strand of the belt would then be passed around the higher roller, then over the other roller and finally beneath a smaller idler roller to the lower strand.

In the use of a face conveyer, it is important to provide for ready advance of the conveyer with the face as the working thereon proceeds, and it will have been realized that the mounting of the discharge and return units on slidable base plates, sleds or the like enables these units to be easily moved for this purpose. It is necessary, however, to have regard to the fact that a face conveyer extending the length of a coal face has a long and somewhat heavy belt and it is advantageous if advance of this to the new position can be effected without break of joint so that it may be readily moved up in a manner to be hereinafter described. The invention therefore provides for quick release of the belt $d$ from the return unit $b$, and quick re-mounting thereon, without breaking the belt. To this end, in the bowed or loop-like construction described, the roller frame of the return unit may be pivotally connected by means of lugs 5 with a column 6 erected on the base plate or the like $c$ at one side of the frame or in some cases erected just like a screw post between the roof and floor of the mine working. In normal operation, the frame of the return unit is held squarely on its base plate by releasable fastening means such as a bolt, or say a hinged catch 7, situated on the opposite side to the column 6. When the fastening is liberated, however, the frame, with its series of rollers 4, can be swung about the column clear of the belt. This releases the belt and the advance of the conveyer can then be effected. Liberation of the belt from the return unit may, of course, be attained in other ways as by substituting detachable rollers for the rollers 4 or a joint in the belt might be brought conveniently near to the return unit and broken and re-made clear thereof, though this method is not so convenient and precludes having such a strong joint in the belt as the other methods permit. If the return unit has the conventional form of rollers described, one or other of these may be made detachable to release the belt.

Along the length of the conveyer belt $d$ sets of rollers 8 may be provided on the trestles $e$ at suitable intervals as in Figure 1 to give appropriate support and in addition to keep the lower strand as free as possible from the floor. These roller sets may be such as are normally used for belt-supporting purposes, varying according to whether the upper and lower strands of the belt are to be troughed or flat. The conveyer being of flexible type, is accomodated readily to any irregularities of the floor such as may occur in mines.

In the operation of the conveyer, the motor $k$ is set going and during travel of the belt, coal is loaded on to the lower strand thereof. The loading may be continuous and over the whole or part of the length of the lower strand, and as the height to which the coal has to be lifted is only to the lower strand, it will be realized that less labour is involved in the loading and the latter may be more expeditious. On reaching the discharge unit $a$, the coal discharges from the lower strand over the roller $g$ and is collected from the belt by the chute or chutes, such as $r$, and discharged laterally to a suitable place or receptacle, whereupon the belt passes around the bowed or U-like frame part $n$ of the discharge unit and proceeds to the return unit $b$ at an elevated level. In this position the return strand is out of the way and does not require expensive troughs or pans to protect it against coal spilled on the floor in the loading or spilled during conveying. In some conditions, the upper strand will also prevent pieces of roof stone from dropping into the coal during its travel to discharge. Moreover, when height permits, the upper strand can be conveniently used for auxiliary conveying purposes, so that material can be constantly carried both ways, while the conveyer is running, for instance coal on the lower strand and timber on the upper strand as indicated by way of example in Figure 6a.

The conveyer is of substantially cheaper construction than heretofore and both upper and lower strands of the belt are constantly open to inspection. The elimination of troughs or pans for protection of the return strand also enables the conveyer to be advanced to a new run in a cheaper and quicker manner and other advantages are obtained. For example, a further advantage of the invention resides in the avoidance of the adverse consequences of certain natural conditions. The combined drive and discharge end of a conventional belt conveyer suffers a disability in dusty and wet conditions owing to the fact that dust and small coal adhere to the surface of the belt and become carried round on to the second roller, whether driver or idler, where they fall off to accumulate and clog up until the belt is likely to be stopped, unless they are constantly cleaned out. In the combined drive and discharge unit of this invention, this dust and small coal cannot accumulate but are promptly carried away beneath the discharge chute $r$ by the portion of the belt travelling away from the second roller $h$ and are discharged from the edges of the belt at the foot of the bowed framework with the other coal. They may possibly be carried slightly up the curve of the belt loop but they eventually fall back to discharge with the other coal. The same applies if the drive for the conveyer is at the return unit and, altogether, the facilities for the removal of any adhering dust or small coal are obviously better than the conventional type of conveyer possesses whether the latter has its motor at the discharge end and the dust and small coal go directly round the discharge roller and on to the second roller or has its motor at the return end, for where the load is on the upper strand, the lower strand, even if protected by troughs or pans, can collect dust and small coal at the joints in the pans and often picks up dust off the floor.

When the conveyer is to be moved up to a new face, the intermediate roller sets 8 and their trestles are removed, for instance by making the upper rollers thereof detachable, and the belt $d$ then liberated from the return unit in any of the manners above described. The motor at the discharge unit is now started up and pulls the fold of the belt along to the discharge unit, discharging slack belt into the loop at that end. This slack is man-handled into the new run and by bending the upper strand round an adjacent pit prop and bending the slack over on itself a new fold is formed which is advanced along the new run as the engine continues to pull the old fold out of the old run. This operation is proceeded with until all the belt has been pulled out of the old run and formed along the new run. The discharge unit is then slid forward into the new run and the further end of the belt reengaged with the return unit after putting the latter in its new position. The trestles $e$ are also placed in position and the conveyer is then ready for use on the new face.

A similar procedure is adopted in the case where the motor of the conveyer is at the return unit, excepting that the conveyer belt is liberated at the discharge unit by arranging for removal of the second roller $h$ (the rollers $g$, $h$ then being idler rollers) and the series of rollers $p$ in the bowed or U-like frame part $n$. In such case, of course, the fold is advanced along the new run in an opposite direction to that above described.

In practice, it is naturally preferable to advance the new fold along the new run by power, and man-handling need only be resorted to for bending the slack round into the new run and forming the fold there. For example and as shown in Figure 9, a roller 9, mounted on two loose wheels 10, may be placed through the new fold 11 of the belt $d$ and this roller then connected by a bridle, chains, or the like 13 to a suitable rope 14 led round a pair of wheels, snatch-blocks or the like 15 placed at the end, one in the old run and one in the new. The rope 14 is led back from the aforesaid wheels 15 to a warping drum 20 mounted, say, on the motor coupling shaft or constituted by an extension of one of the motion shafts of the reduction gear employed in the conveyer drive.

The showing in Figure 9 is partly perspective and partly plan but it is believed that it will be sufficient to illustrate that with this arrangement, as the motor of the discharge unit $a$ pulls the fold 12 out of the old run by the lower strand (the necessary tension being easily maintained by pulling the belt away by hand as it is discharged, and sufficient slack having previously been paid out at 16 to enable the upper strand to be bent round the pit prop 17 to start the new fold 11 and allow the roller 9 to be placed therein), the warping drum 20 can be used to pull the new fold 11 away up the new run by the upper strand. The intermediate part 18 of the belt $d$ assumes a stationary or standing condition. The workmen have only to supervise the operation and serve the slack of the loop 16 into the new run, and thus the moving forward can be effected in an advantageously cheap and quick manner. Of course, the fold can only be pulled up to the full desired extent in the new run after the discharge unit has been moved up into line with the new run.

Alternatively, a separate haulage unit might be used which, if desired, could be employed for doing all of the pulling in of the fold in the new run, leaving the conveyer motor only the pulling out of the old fold to do.

In both hand and power advance of the new fold along the new run, there is little likelihood of disturbing pit props and it will also be realized that the moving up operation may be effected with the belt in one piece, so that any joints in the belt can be of a permanent character. This is of considerable advantage as it eliminates those stoppages of the conveyer which are likely to arise from failure of the many temporary joints usually employed for such work. Obviously, however, a belt made up of short pieces fastened together in any conventional manner could be moved forward to a new place or run in the same manner as a one-piece belt or one with permanent joints. Or in using the improved constructions the conveyer belts with conventional fastenings can be moved up into the new run in conventional manner if desired.

The construction thus outlined for face conveying may, of course, be used in other situations and for example is eminently suitable for use as a gate or trunk conveyer with one, two, or more face conveyers (pan or belt) discharging on to the lower strand. In such a case, the conveyer may be of much simpler construction than heretofore because there is no possibility of the material discharged by the face conveyers on to the lower strand being carried into the return end of the receiving gate or trunk conveyer, the motion of the carrying belt being away from the return unit and the other strand being clear away up above the discharged coal. Thus the elaborate precautions usually taken to prevent spillage on to the lower strand are unnecessary.

In the construction illustrated by Figure 10, the conveyer is provided with a discharge unit $a$ of similar construction to that shown in Figures 1 to 3, but in addition to the return unit at $b$, there is an extra return unit forward at $b'$. The return units are shown diagrammatically by circles but they may be of the same form as in Figures 1, 7 and 8 or of any other form illustrated herein or may comprise a slidable base plate, sled or other like support for a roller arrangement of conventional form for the endless belt $d$. With the extra return unit at $b'$ the belt instead of being taken to the upper strand round the bowed or U-form frame part $n$ of the discharge unit $a$ is carried further on so as to form an elongated loop 22 having its extremities at the bottom and top of the frame bow $n$. The advantage of this construction is that it enables the return unit at $b$ to be adjusted, say to suit different points of feed, without putting short inserts into, or removing them from, the belt $d$. Daily increase of the effective length of the conveyer, for example in extending a longwall face or other place in a mine or, more particularly, in advancing the return unit $b$ of the conveyer to new positions in a gate, can thus be effected by moving the forward return unit $b'$ towards the discharge unit as the return unit $b$ is moved up to new positions. In normal conditions the belt between the discharge unit and the forward return unit $b'$ will not be used for conveying. When the elongated loop 22 becomes shortened back as close as is convenient to the discharge unit $a$, another, but considerable, length of belt can be inserted in the belt $d$ to permit the forward unit $b'$ being brought back to its initial position. As an alternative, the discharge unit $a$ might be moved in relation to the return unit $b$. There may be an idler roller 23 between the discharge unit $a$ and the forward return unit $b'$ and trestles with rollers may be used at intermediate points in the belt as aforesaid, while in order to prevent undue accumulation of dust at the forward return unit, the belt may, as shown by dotted lines, be carried about half-way round the discharge unit framework before being taken over an idler roller or rollers to the forward point.

Movement of the discharge unit $a$ relatively to the return units $b$ and $b'$ would only be at long intervals in mines, if at all, but in other cases, for example, in the laying of coal into storage, in charging coke-ovens, or on a quayside for discharging cargo, or in factories, it might be convenient to have the units $b$, $b'$ in more or less fixed positions and to arrange the discharge unit on rails or the like as at 24 so that it may be readily moved for discharging at any situation between $b$ and $b'$. Of course, the slidable base plate, sled or the link of the units $b$ and $b'$ would enable these units to be readily moved to new positions when desired.

A further advantage of an arrangement with extra return unit such as is shown in Figure 10, is on faces where no determination of the height is conveniently possible at the discharge point. In such a case the bowed frame of the discharge unit might be constructed so that the upper half could be removed and the extra return unit used instead to take the upper strand of the belt, being placed a yard or two over on the floor on that side of the gate opposite to the face. By then using a tipping roller in the position of the idler roller shown in dotted lines in Figure 10, that portion of the lower strand of the belt lying between that roller and the return unit $b'$ can, by reversal of the belt, be used for the removal of coal, on that side of the roadway, which is to be moved to put on road packs, this coal being tipped off the belt at the tipping roller. Furthermore, as, in normal running of the conveyer, the slack would be delivered towards the return end $b'$, the latter affords a convenient place for occasional extra tensioning of the belt, especially on long faces, as it saves a long journey to the other end of the face. Discharge of the coal laterally from within the discharge unit in constructions like Figure 10 may be effected in the same manner as described with reference to Figures 1 to 3. The plough or deflector is of convenient use and the half bow generally of sufficient extent to cause any fine coal which may pass beneath the plough to fall off and discharge as aforesaid.

In the modification illustrated in Figures 11 to 13, a gate conveyer and loader construction is attained by mounting the bowed or U-like frame part $n^1$ of the discharge unit $a$ above the main frame $f$ carrying the motor $k$ so that the belt $d$ is elevated for discharge to tubs or other receptacles, and an elongated loop $22a$ for adjustment purposes, is formed by leading the belt to a roller or U-frame situated at $b'$ under the lower strand of the conveyer belt at that part where it is elevated for discharge. For the lower strand of the belt, the discharge unit $a$ may have a pair of rollers like $g$, $h$ in Figure 2 but mounted in an upper frame part $f'$, or as shown, there may be a single discharge roller $g'$ on the frame part $f'$, from which the belt passes to a pair of rollers $h'$ on the main frame $f$. The belt passes from one of these rollers to the loop $22^a$, and is led back to the upper strand over the rollers on the bowed frame part $n^1$, suitable idler rollers being provided where required. The drive of the motor $k$ in Figures 11 to 13, is transmitted to one or other or both of the rollers $h'$, transmission means such as a coupling 26, reduction gear box 27 and chain or like drive 28 being employed as necessary. A shallow frame 29 extends rearwardly from the frame $f$ of the discharge unit for receiving and supporting the elongated loop $22^a$. The loop roller or the like at $b'$ may be placed on a slide or wheeled carriage 30 so as to be movable along guides 31 of the frame 29 and both the frame $f$ and the frame 29 may have wheels or the like, as at 32 for running on rails 33. The loop frame 29 may also comprise frame parts 34 for rollers 35 for the bottom strand of the belt which may be troughed, as shown in Figure 13, or be flat. The elongated loop is supported between its ends in the frame 29 by rollers such as 36 carried by the parts 34, and by rollers such as 37 mounted in the guides 31, by slides such as 38. The lower part of the frames 34 may rest on the rails 33 as seen in Figure 13. Any drawing in of the loop $22^a$ consequent, for example, upon adjustment of the discharge unit $a$ along the rails 33 or adjustment of the return unit of the conveyer (not shown), will cause the carriage 30 to be drawn along the guides 31 of the frame 29 and when the carriage reaches a roller 37 it will move it along with it on its slides 38. Drawing out of the loop $22^a$ in the opposite manner may be effected by the winch 39 and rope or cable 40, the rollers 37 being readjusted by hand when necessary. In Figures 11 and 12 there is also shown a modified form of discharge chute or spout $r$, this device being pivotally mounted as at 41, instead of being fixed, and open at each end so that, with the conveyer in between two parallel lines of tubs, as indicated in Figure 12, alternate discharge to the respective sets of tubs is possible with instant changeover from one set to the other.

The modification illustrated by Figure 14 is of advantage in cases where the goaf or waste has to be packed in with material brought into the mine. As shown, in addition to the discharge unit $a$ and return unit $b$, this conveyer also comprises what may be termed an auxiliary discharge unit 42 consisting of a transportable frame carrying two idler rollers 43, 44 and a discharge spout or chute 45. The conveyer would be placed along the face, and normally discharge coal at $a$ in the manner already described, the auxiliary unit 42 then being placed out of the way close up to the return unit $b$. As soon as the face working is finished, however, the auxiliary unit 42 could be moved to and fro so as to discharge into the goaf material placed upon the lower strand of the belt, at say, a tail gate. Such material could be discharged at any point along the goaf by appropriately moving the unit 42 and the arrangement would considerably expedite the stowing solid of the goaf as is required before the face is advanced. The conveyer shown in Figure 10 might also be used for goaf stowing by traversing the discharge unit $a$ thereof in a similar manner.

The conveyers may be used singly or in combination, for example face conveyers may be used in conjunction with gate conveyers and suitable operation is possible on two longwall advancing faces with two conveyers feeding to a single gate conveyer, though obviously other combinations are possible. As will be understood from Figure 15, the gate conveyer 46, in a gate 47, may be arranged to stand below the discharge unit or units $a$ of a face conveyer or conveyers and receive the discharge therefrom by an appropriate discharge chute or chutes 48. Or as shown in Figure 16 the gate belt 46 may be put through the bow or bows of the discharge unit or units of the face conveyer or conveyers, particularly if height is limited. In this case, double face working would require the faces to be stepped apart a little in plan to get the two bows overlapping in the gate.

A slightly different arrangement of the belt rollers before shown, is illustrated in the diagrammatically represented discharge units in Figures 15 and 16 but various suitable arrangements of these rollers are possible as will be understood.

In Figure 17 a construction of the discharge units is shown in which the bow or bend $n^2$ of the bowed or U-like frame, instead of being of semicircular form is of rectangular or squared configuration. Figure 18 shows a V form bow or bend $n^3$ and other part-polygonal shapes are possible, while similar modifications for the bow or bend may be adopted for the return units.

As an alternative to the part-circular series of rollers seen in Figures 7 and 8, the return unit may also advantageously comprise a complete circular series of rollers 49 mounted revolubly on the inside of two wheels such as 50, see Figure 19. The wheels are of larger diameter than the series of rollers and may be braced together by bolts or rods 51 and be provided with a spindle 52. This is a very simple form of the return unit and it may be held in position in the conveyer belt in any suitable manner for instance by a bridle 53 mounted on the spindle 52 of the wheels and roped, say, to a spike or sheave or otherwise secured. Obviously, the circular series of rollers 49 might be replaced by a single roller mounted revolubly on the spindle 52. This roller would suitably be of the same diameter as the series of small rollers and preferably be cambered to centralize the belt. On removal of the bridle 53 or the like, the roller or series of rollers can be readily wheeled out of position on the wheels 50 so as to be free of the belt, and as readily wheeled back again. A further advantage of this arrangement is that it provides, of itself, a suitable roller device for use, like the roller 9 of Figure 9, in advancing the conveyer to a new place, and when the belt is in the new position, the roller or series of rollers on the wheels 50 can be used as a return unit without replacing it by any other form of return unit. In normal running of the conveyer, it may be required to prevent rotation of the wheels 50 and this can be very readily done by forming holes such as 54 in the two wheels to register with similar holes such as 55 in the bridle 53. Then the passing of a toggle bar or bars or the like through the aligned holes in bridle and wheels prevents rotation of the wheels, and makes the return unit function for the time being simply as a "skid" with the roller or rollers revolubly mounted thereon. Removal of the toggle bar or bars again permits rotation of the wheels to facilitate removal of the roller or series of rollers from, or insertion thereof into, the belt, or for employment in pulling a new fold of belt along a new run as has been already described.

The trestle and roller devices for supporting the belt intermediately between the discharge and return units of the conveyer, may be simplified and reduced in cost by having rollers at only one place on the bottom of the trestles instead of at two places and the sets of rollers may be detachable if desired. The roller trestles may also have pivotal sides to render them collapsible or to enable the height of the top rollers to be adjusted. In one construction illustrated in Figures 20 and 21 the trestle comprises a slightly arched base frame 56 with perforated lugs 57 at the ends in which the side members 58 are mounted by pivots 59 so as to be collapsible outwardly. The sides 58 may be held in erect position by the axle 60 of the upper rollers 61 which fits at its ends into the open upper ends of notches 62 formed in junction plates 63 at the tops of the sides 58 and is enlarged outside the notches as at 64 to retain the sides. There may be a single bottom roller at the middle of the base and the roller may be removable. The rollers may be straight for flat belt configurations, or arranged to suit troughed belt configurations. In the latter case, the axle for the upper belt strand may be bent as shown and several rollers 61 be placed end to end thereon, while for the lower strand, there may be two rollers 65 placed end to end and mounted on spindles in a bracket device 66 of shallow V form extending across the base and provided at the middle and ends with upstanding bearing parts 67 for the spindles. The latter may be received in notches 68 in the outer bearing parts 67 so that the rollers are easily mounted. In another construction shown in Figures 22 and 23, the trestle legs are separate from each other and mounted to swivel in eyes 69 pivoted horizontally on the base frame 56 which may be flat. One leg 58a of each pair is of double form, with a pin 70 extending across the space between and the other leg 58b is of single form with a series of notches 71 on its lower side at the upper end, so that it may be passed through the other leg 58a and engage the pin 70 by one or other of the notches 71. This is a convenient method of adjusting the height of the upper roller or rollers which may be carried by the double legs 58a and it also enables the sides to be collapsed by radial movement, in which position and after removal of the roller spindle 60, they may be turned out with their broad sides flat by swivelling them in the eyes 69. The upper and lower roller devices may be constructed and mounted similarly to those described with reference to the last construction, though as a variation a pair of inclined rollers 72 is shown for the upper belt strand, a similar pair of rollers 73 being used for the lower strand. In a further construction depicted in Figures 24 and 25, the arrangement is generally similar to the one just previously described, but in this case, the collapsing is provided for by pivotally mounting the legs 58a, 58b of each side on a bottom member 74 which is horizontally pivoted at 75 on the base 56, so as to permit the legs to be swung outwardly. The bottom roller bracket 66 in this construction is detachably mounted in slots 76 of the bottom members 74 so that the roller assembly may be detached as a whole, and a similar arrangement may be adopted in the other constructions. A single straight upper roller 77 is shown in Figures 24 and 25 to give the upper belt strand a flat formation, but similar constructions to those previously described may be used. In suitable cases the rollers for troughed belt may be given a set opposite to the direction of travel of the belt, as seen for instance in Figures 21, 23 and 25, in order to preserve the troughed formation of the belt. Provision for adjustment of the height of the upper rollers as in Figures 22 to 25 is advantageous to suit various thicknesses of seams in mines or the like or to meet variations in height along any particular longwall face. The same provision also makes the upper rollers capable of easy release to allow collapsing of the trestles even if roof stone or timber comes on to such rollers. In practice, the trestles have to be moved into a new run each time the belt is moved forward with the advance of the face in a mine, and provision such as described for collapsibility of the trestles readily allows of this. If the belt is pulled into the new run before the trestles are placed therein, the frame of the trestles can be easily inserted between the floor and the two flights of the belt and the rollers then assembled. On the other hand, the trestles are just as easily moved before the belt is pulled out of the old run. In addition the trestle frames when laid, collapsed, in the new run do not impede the passage of the roller pulling up the fold in the new run. The trestles are also capable of being collapsed to a very flat condition and enable all these advantages to be simply achieved. The lower rollers of the trestles may be of similar construction to the upper rollers if desired.

Although the invention has been described with the conveyer belt operating without troughs or pans, it will be realized that under some conditions, the upper strand may advantageously be run in troughed pans either with or without rollers or it might be supported on some other bed with or without rollers. The lower strand may also be run in troughed pans with or without rollers or in suitable conditions on the floor or other bed without rollers or the like. It is also convenient where necessary to employ spill plates or side plates in conjunction with the belt to direct large pieces of coal and keep them on the belt.

Finally, it is to be understood that other modifications are possible without departing from the scope of the invention.

We claim:

1. In a transportable endless-belt conveyer of the flexible type suitable for coal and like materials, a movable discharge unit having a roller revolubly mounted in its interior to which the lower strand of the belt is led for load discharge over said roller, and a bowed frame formation provided around the bow with a series of rollers by which the belt is formed into open loop after said discharge and before passing to the upper strand.

2. In a transportable endless-belt conveyer of the flexible type suitable for coal and like materials, a movable discharge unit having a roller revolubly mounted in its interior to which the lower strand of the belt is led for load discharge over said roller and a bowed frame formation provided around the bow with a series of rollers by which the belt is formed into an open loop after said discharge and before passing to the upper strand, said discharge unit having a main frame with said bowed frame formation in an elevated position thereon to adapt the conveyer for gate loading in mines.

3. In a transportable endless-belt conveyer of the flexible type suitable for coal and like materials, a movable discharge unit having a roller revolubly mounted in its interior to which the lower strand of the belt is led for load discharge over said roller, a bowed frame formation which supports the upper strand of the belt and provides open space within for allowing lateral removal of the material discharged over said roller, a chute of gridded nature extending laterally from said discharge roller for the lateral removal of the larger material and means for the lateral removal of the small material passing through said gridded chute.

4. In a transportable endless-belt conveyer of the flexible type suitable for coal and like materials, a movable discharge unit having a roller revolubly mounted in its interior to which the lower strand of the belt is led for load discharge over said roller, and a bowed frame formation which supports the upper strand of the belt and provides open space within for allowing lateral removal of the material discharged over said roller, and a movable return unit having a bowed frame part for the belt and which frame formation is swingably mounted to allow dismantling and re-mounting of the belt without break of joint.

5. In a transportable endless-belt conveyer of the flexible type suitable for coal and like materials, a movable discharge unit having a roller revolubly mounted in its interior to which the lower strand of the belt is led for load discharge over said roller and a bowed frame formation which supports the upper strand of the belt and is provided with a series of rollers by which the belt is formed into an open loop after said discharge, and a movable return unit comprising a frame having a series of rollers for forming the belt into a loop.

6. In a transportable endless-belt conveyer of the flexible type suitable for coal and like materials, a movable discharge unit having a roller revolubly mounted in its interior to which the lower strand of the belt is led for load discharge over said roller and a bowed frame formation which supports the upper strand of the belt and is provided with rollers by which the belt is formed into an open loop after said discharge, a movable return unit comprising a circularly shaped frame formation with roller means for forming the belt into a loop, and portable collapsible roller frames supporting said belt at points between said units.

7. In a transportable endless-belt conveyer of the flexible type suitable for coal and like materials, a movable discharge unit having a roller revolubly mounted in its interior to which the lower strand of the belt is led for load discharge over said roller and a bowed frame formation which supports the upper strand of the belt and is provided with rollers by which the belt is formed into an open loop after said discharge, a movable return unit comprising a circularly shaped frame formation with roller means for forming the belt into a loop, and portable collapsible roller frames of adjustable height supporting said belt at points between said units.

JOSEPH NELSON OCTAVIUS ROGERS.
THOMAS CHARLTON.

CERTIFICATE OF CORRECTION.

Patent No. 1,977,147.  October 16, 1934.

JOSEPH NELSON OCTAVIUS ROGERS, ET AL.

It is hereby certified that error appears in the printed specification of the above numbered patent requiring correction as follows: Page 2, lines 29-30, strike out the words "the other or the other or"; page 7, line 112, claim 1, before "open" insert the word an; and page 8, lines 2-3, claim 4, for "formation" read part; and that the said Letters Patent should be read with these corrections therein that the same may conform to the record of the case in the Patent Office.

Signed and sealed this 12th day of February, A. D. 1935.

Leslie Frazer (Seal)

Acting Commissioner of Patents.